Sept. 4, 1928. J. H. HUNT Re. 17,074
IGNITION SYSTEM
Original Filed May 1, 1923
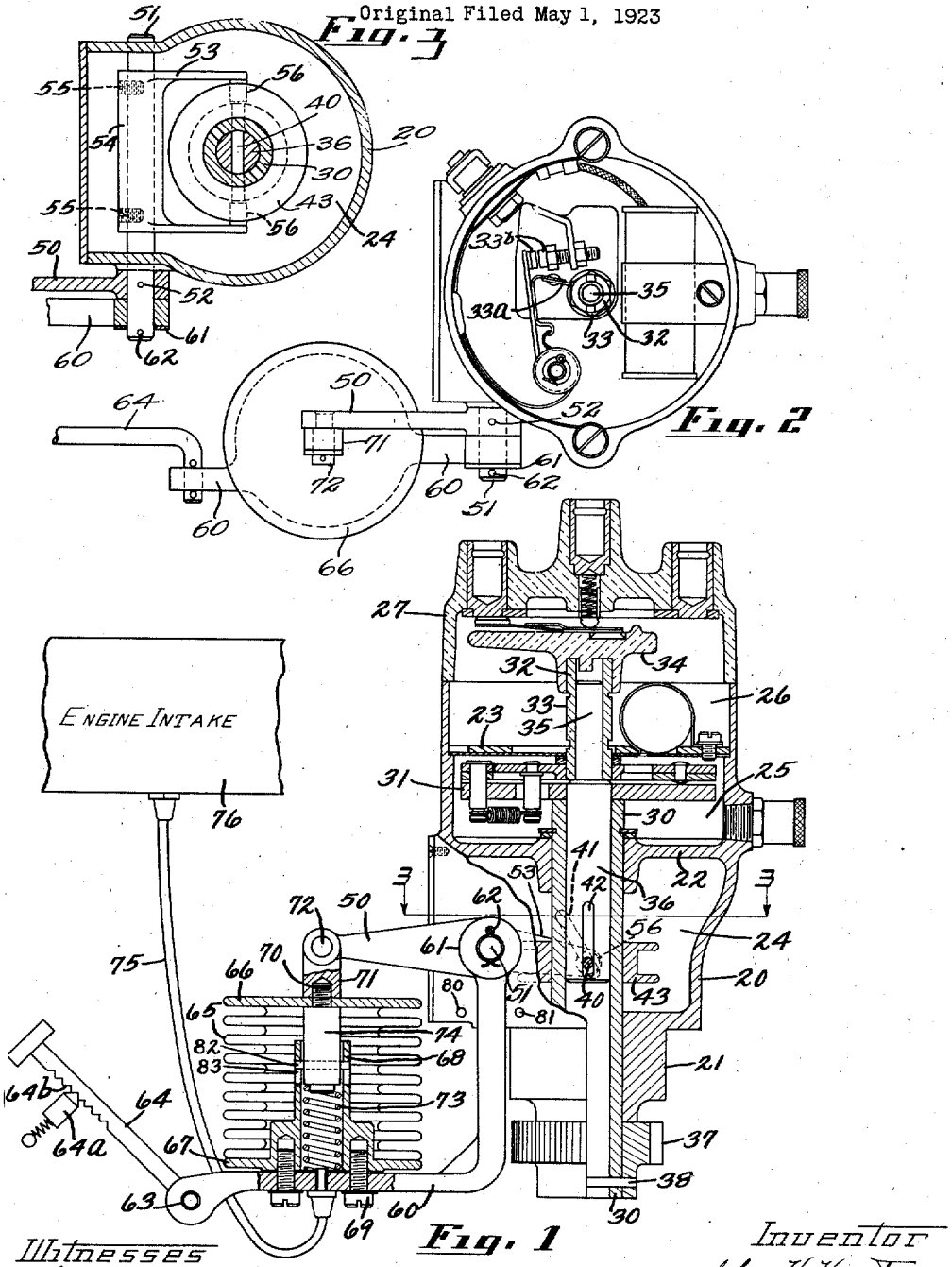
Witnesses
Geo. E. Pasco
Wm. S. Pasco
Inventor
John H. Hunt
By Francis D. Hindich
His Attorney Reissued Sept. 4, 1928.

Re. 17,074

UNITED STATES PATENT OFFICE.

JOHN H. HUNT, OF DETROIT, MICHIGAN, ASSIGNOR TO GENERAL MOTORS RESEARCH CORPORATION, OF DAYTON, OHIO, A CORPORATION OF DELAWARE.

IGNITION SYSTEM.

Original No. 1,590,827, dated June 29, 1926, Serial No. 636,007, filed May 1, 1923. Application for reissue filed January 27, 1928. Serial No. 250,025.

This invention relates to ignition apparatus for internal combustion engines and has among its objects to provide improved means for controlling the timing of the ignition in response to engine load conditions as well as by means responsive to engine speed or by means capable of manual control.

One object of the invention is to provide a device which can be easily attached to conventional forms of ignition apparatus having either the manual or the speed responsive control of the ignition timing or both, said device providing a control of ignition timing in response to engine load.

Another aim of the present invention is to improve the manner of controlling the timing of the ignition in response to variations in engine load conditions whether or not in combination with other means of control. I accomplish this aim by a novel construction which comprises a drive shaft and a driven shaft connected with the cam, one shaft being within the other, a member movable along the shafts and so connected with them that the driven shaft will be rotated relative to the drive shaft when the member is moved, and which comprises a device responsive to variations in engine load conditions for moving the member along the shafts.

In another aspect of the present invention it constitutes an improvement in apparatus for controlling the timing of the ignition both in response to variations in engine speed and to variations in engine load conditions. For providing such improvement, the invention includes a construction comprising a cam carrying shaft which carries the cam for operating the timer interrupter, an intermediate driven shaft, a main drive shaft and two devices for connecting the intermediate shaft with the other shafts respectively, one of the devices operating in response to variations in engine speed for changing the angular relation between the cam and drive shaft and the other of the devices operating in response to variations in engine intake pressure for changing the angular relation between the cam and drive shaft.

Further objects and advantages of the present invention will be apparent from the following description, reference being had to the accompanying drawings, wherein a preferred form of embodiment of the present invention is clearly shown.

In the drawings:

Fig. 1 is a sectional view of ignition apparatus provided with the present invention.

Fig. 2 is a plan view of the apparatus shown in Fig. 1, with the distributor head removed.

Fig. 3 is a sectional view on line 3—3 of Fig. 1.

In the drawings, 20 designates an ignition timer housing provided with a cylindrical shank at 21 adapted to be received by an aperture in an engine frame. Housing 20 is divided by a partition 22 and by a breaker lever plate 23 into compartments 24, 25 and 26, the compartment 26 being covered by a distributor head 27. The shank 21 and the partition 22 provide bearings for a hollow drive shaft 30, which supports at its upper end a speed responsive device 31 of the conventional "flat weight" type, a type well known in the art. This device 31 is connected with a hollow sleeve or cam-carrying shaft 32 providing a timer cam 33 and a seat for a distributor rotor 34, and is connected with an intermediate driven shaft 36 which is located within the drive shaft 30 and capable of relative movement thereto. The cam-carrying shaft 32 is rotatably mounted upon a reduced end 35 of shaft 36. Cam 33 cooperates with a breaker lever $33^a$ to separate contacts $33^b$.

The drive shaft 30 carries a driving gear 37 attached by pin 38. Shafts 30 and 36 are connected by means of a pin 40 which extends through diametrically opposite spiral slots 41 in shaft 30 and through a longitudinally extending notch 42 adjacent the lower end of shaft 36. Pin 40 is supported at its end by means of a grooved collar 43 slidable axially along the shaft 30.

Motion is transmitted from the gear 37 and from shaft 30 to the intermediate driven shaft 36 by means of the pin and slot connections mentioned. From the intermediate shaft 36 motion is transmitted to the cam-carrying shaft 32 and to the cam 33 and rotor 34 by means of the speed responsive device 31 in the usual manner. The device 31 functions to produce relative movement between the cam 33 and the shaft 36 in response to variations in engine speed. By shifting the collar 43 axially the shaft 36 can be moved relative to the shaft 30 in order to control the ignition timing by means other than in response to variations in engine speed.

The means for shifting the collar 43 includes a lever 50 mounted on a shaft 51 and attached thereto by means of a pin 52. Within the chamber 24 there is located a yoke 53 having its hub 54 attached by set screws 55 to the shaft 51 and having its branches provided with pins 56 for cooperating with the grooved collar 43. The lever 50 constitutes a movable member supported by the ignition housing or support 20, and lever 50 is adapted to be actuated manually or by other means for controlling the timing of the ignition. In conventional types of ignition apparatus such levers are generally connected with the spark lever on the steering column of an automobile in any suitable fashion.

In one of its aspects the present invention provides an attachment for types of ignition apparatus which are provided with a movable member such as the lever 50 for controlling the ignition timing. This attachment provides for the control of ignition timing in response to engine load conditions, while at the same time permitting the operation of the movable member 50 manually. This attachment includes a bracket 60 which is pivoted loosely upon one end of the shaft 51 and is held in position by means of a washer 61 and pin 62. The bracket 60 is attached at 63 to a manually operable rod 64 located within convenient reach of the automobile driver, and is held in positions of manual adjustment by a spring pressed plunger 64[a] which cooperates with notches 64[b] in rod 64. To transmit motion from the bracket 60 to the lever 50 there is provided mechanism which constitutes an adjustable link connecting the bracket 60 with the lever 50. This mechanism comprises a bellows 65 sealed at its upper end by a plate 66, and at its lower end by the flange 67 of a tube 68 attached by screws 69 to the bracket 60. The plate 66 is attached by means of a screw 70 to a link 71 connected by means of a stud 72 with the lever 50. A spring 73 is interposed between the bracket 60 and the head 74 of the screw 70 and tends normally to hold the bellows 65 in the position shown in Fig. 1. The interior of the bellows 65 is connected by means of a flexible tube 75 with the engine intake 76.

The operation of the invention is as follows: To adjust the ignition timer manually the rod 64 is moved and motion is transmitted to the ignition timing lever 50 by means of the adjustible link mechanism described. When the engine is operating under partial load the throttle will be only partly open, therefore the engine intake suction will be higher than when the throttle is wide open. Therefore there will be a partial vacuum in the bellows 65 tending to shorten the linkage between bracket 60 and lever 50. The collar 43 will be moved upwardly for the purpose of advancing the spark as engine load decreases. On the other hand when the engine load increases the throttle will be open relatively wide and the suction in the engine intake will decrease thereby relieving the vacuum in the bellows 65 and permitting the spring 73 to increase the length of the linkage between bracket 60 and lever 50. This action tends to move the collar 43 downwardly to retard the spark. The action of collar 43 is based upon the assumption that the rotation of the cam 33 is counterclockwise. If the rotation of the cam 33 were clockwise it is obvious that the direction of the spiral slots 41 would need to be reversed.

Instead of connecting the pipe 75 with the engine between the engine intake and the throttle of the carburetor the pipe 75 could be connected in such a manner that as engine load increased the suction in the bellows would increase instead of decrease. Then it is obvious that the direction of the spiral slot 41 would be reversed in order that upward movement of the collar 43 would retard instead of advance the spark with increasing suction in the bellows 65. Such connections with the carburetor are shown in the patent to Kennington 1,360,758 and in the patent to A. E. Berdon 1,388,628, which make provisions for retarding the spark when the engine is idling as well as retarding with increasing engine load.

Stop pins or studs 80 and 81 project from the housing 20 into the path of movement of the bracket 60 so as to limit the manual movement of said bracket to a predetermined degree of advance and retard. The screw head 74 is provided with a pin 82 which extends through elongated holes 83 provided in the member 68, whereby the movement of member 74 relative to member 68 is limited. In this manner the amount of advance and retard produced by engine suction is limited to a predetermined amount.

In another of its aspects the present invention provides an ignition timing apparatus in which a rotary drive member and a rotary cam for operating the timer interrupter are connected by a device which will angularly displace the cam relative to the drive member in response to variations in engine load conditions. This construction provides for the control of the ignition timing without requiring the housing or interrupter to be moved relative to the cam as in A. E. Berdon Patent #1,388,628 and without requiring axial displacement of the cam as in the patent to G. B. Stone #1,338,336. In order to provide for controlling the timing of the ignition in this manner, the construction includes the collar 43 which slides along the drive shaft 30 and is connected with the drive shaft and with the cam 33 through the intermediate shaft 36 by a pin 40 extending through slots on grooves in the shafts 36 and 30, one of the grooves, the slot 41, being oblique to the axes of the shafts, and includes the metal bellows 65 and lever 50 for moving the collar 43.

In still another of its aspects the present invention provides an improved manner of controlling the timing of the ignition in response to engine speed and load conditions. In order to provide this control, the invention includes the novel construction comprising the cam-carrying shaft 32, the intermediate driven shaft 36 and the main drive shaft 30. Intermediate driven shaft 36 is connected with the cam-carrying shaft 32 by the speed responsive device 31 and the intermediate shaft 36 is connected with the drive shaft 30 by means operated in response to variations in engine load conditions, namely, the pin 40 which cooperates with the slots 41 and 42 and which is carried by the sliding collar 43 which is moved in accordance with the expansion and contraction of the bellows 65 comprising a suction chamber communicating with the engine intake 76. Since both the speed responsive and engine load responsive devices for controlling the timing of the ignition operate upon different portions of the driving train between the gear 37 and the cam 33, it is not necessary to provide for rotation of the interrupter relative to the cam. Therefore a stationary housing can be employed for supporting the devices which control the timing of the ignition.

While the form of embodiment of the present invention as herein disclosed, constitutes a preferred form, it is to be understood that other forms might be adopted, all coming within the scope of the claims which follow.

What is claimed is as follows:

1. In ignition apparatus for internal combustion engines, the combination with a breaker lever element and a cam element; of means for moving one of the elements relative to the other in response to engine suction, said means including a suction chamber having a movable wall; and means for manually moving said element, said manual means including the suction chamber through which motion is transmitted from the operator to said element.

2. In ignition apparatus for internal combustion engines, the combination with a breaker lever element and a cam element; of means for moving one of the elements relative to the other in response to engine suction, and including a metal bellows connected with the engine intake; and means for manually moving said element, said manual means including the metal bellows through which motion is transmitted axially of the bellows from the operator to said element.

3. In ignition apparatus for internal combustion engines, the combination with a breaker lever element and a cam element; of mechanism including a lever for angularly displacing one of the elements relative to the other; a metal bellows connected with the intake of the engine and having one end wall connected with said lever; and manual operated means including an operating handle for moving said lever, said manual means being connected with the other end wall of the bellows and operating through the bellows to move the lever; and means for yieldingly maintaining said handle in adjusted position thereby maintaining stationary said other end of the bellows.

4. In ignition apparatus, the combination with a breaker element and a cam element and a support for said elements; of a shaft mounted on said support; means for moving one of said elements relative to the other including a lever attached to said shaft; engine suction responsive means including a collapsible elment mounted on said shaft and manually operable means for moving both the collapsible element and said lever.

5. In ignition apparatus, the combination with a breaker element and a cam element and a support for said elements; of a shaft mounted on said support; means for moving one of said elements relative to the other including a lever attached to said shaft; engine suction responsive means including a bellows; a bracket pivotally mounted on said shaft and supporting said bellows; means connecting the bellows with the lever; and manually operable means connected with the bracket.

6. Ignition apparatus for internal combustion engines comprising, in combination, a circuit interrupter, a rotary cam for operating the interrupter, a rotary drive-member, means for preventing substantial axial movement of the cam and drive-member, and means responsive to variations in pressure in the engine intake for varying the angular relation between the drive-member and cam.

7. Ignition apparatus for internal combustion engines comprising, in combination, a circuit interrupter, a rotary cam for operating the interrupter, a rotary drive-member, means for preventing substantial axial movement of the cam and drive-member, and devices for controlling the angular relation between the drive-member and cam manually and in response to variations in pressure in the engine intake.

8. Ignition apparatus for internal combustion engines comprising, in combination, a circuit interrupter, a rotary cam for operating the interrupter, a rotary drive-member, means responsive to variations in engine speed for changing the angular relation between the drive-member and cam, and means responsive to variations in engine load for

BEST AVAILABLE COPY changing the angular relation between the drive-member and cam.

9. Ignition apparatus for internal combustion engines comprising, in combination, a circuit interrupter, a rotary cam for operating the interrupter, a rotary drive-member, and connections between the drive-member and cam comprising an intermediate drive-device, a cam-carrying member, means responsive to variations in engine speed for changing the angular relation between the intermediate drive-device and one of the members, and means responsive to variations in engine load conditions for changing the angular relation between the intermediate drive-device and the other member.

10. Ignition apparatus for internal combustion engines comprising, in combination, a circuit interrupter, a rotary cam for operating the interrupter, a rotary drive-member, and connections between the drive-member and cam comprising an intermediate drive-device, a cam-carrying member, means responsive to variations in engine speed for changing the angular relation between the intermediate drive-device and the cam-carrying member, and means responsive to variations in engine load conditions for changing the angular relation between the drive shaft and the intermediate drive-device.

11. Ignition apparatus for internal combustion engines comprising, in combination, a circuit interrupter, a cam for operating the interrupter, a tubular cam-carrying shaft, a tubular drive shaft, an intermediate shaft within the two tubular shafts, means responsive to variations in engine speed for connecting the intermediate shaft with one of the tubular shafts and for changing the angular relation between them, and means responsive to variations in engine load conditions for connecting the intermediate shaft with the other of the tubular shafts and for changing the angular relation between them.

12. Ignition apparatus for internal combustion engines comprising, in combination, a circuit interrupter, a cam for operating the interrupter, a tubular cam-carrying shaft, a tubular drive shaft, an intermediate shaft within the two tubular shafts, means responsive to variations in engine speed for connecting the intermediate shaft with the cam-carrying shaft and for changing the angular relation between them, and means responsive to variations in engine load conditions for connecting the intermediate shaft and the drive shaft and for changing the angular relation between them.

13. Ignition apparatus for internal combustion engines comprising, in combination, a circuit interrupter, a cam for operating the interrupter, a tubular drive shaft, an intermediate drive shaft journalled within the tubular drive shaft, a cam-carrying shaft journalled upon the intermediate drive shaft, speed responsive means attached to the intermediate shaft and connected with the cam-carrying shaft for changing the angular relation between the said shafts, and other means for connecting the drive and intermediate shafts and for varying the angular relation between them.

14. Ignition apparatus for internal combustion engines comprising, in combination, an interrupter, a cam for operating the interrupter, a drive shaft, a member movable axially along the shaft, means for connecting the member with the shaft so as to turn the member relative to the shaft as it moves along the shaft, means responsive to variations in engine load conditions for moving said member, and means responsive to variations in engine speed for connecting said member and cam and for changing the angular relation between them.

In testimony whereof I hereto affix my signature.

JOHN H. HUNT.